United States Patent
Plante et al.

(10) Patent No.: US 8,649,933 B2
(45) Date of Patent: Feb. 11, 2014

(54) POWER MANAGEMENT SYSTEMS FOR AUTOMOTIVE VIDEO EVENT RECORDERS

(75) Inventors: James Plante, Del Mar, CA (US); Ramesh Kasavaraju, San Diego, CA (US); Bruce Lightner, San Diego, CA (US)

(73) Assignee: SmartDrive Systems Inc., San Diego, CA (US)

( * ) Notice: Subject to any disclaimer, the term of this patent is extended or adjusted under 35 U.S.C. 154(b) by 1640 days.

(21) Appl. No.: 11/593,682

(22) Filed: Nov. 7, 2006

(65) Prior Publication Data

US 2008/0122288 A1    May 29, 2008

(51) Int. Cl.
  *G06F 7/00*  (2006.01)

(52) U.S. Cl.
  USPC .............. 701/33.3; 701/32.2; 701/36; 701/69

(58) Field of Classification Search
  USPC .......... 701/29, 35, 36, 32.2, 33.3, 69; 342/52, 342/55, 70, 175; 348/148, 149, 118, 117
  See application file for complete search history.

(56) References Cited

U.S. PATENT DOCUMENTS

| | | | |
|---|---|---|---|
| 5,570,127 A | 10/1996 | Schmidt |
| 5,586,130 A | 12/1996 | Doyle |
| 5,815,071 A | 9/1998 | Doyle |
| 5,815,093 A | 9/1998 | Kikinis |
| 6,002,326 A | 12/1999 | Turner |
| 6,088,635 A | 7/2000 | Cox et al. |
| 6,185,490 B1 | 2/2001 | Ferguson |
| 6,246,933 B1 | 6/2001 | Bague |
| 6,259,475 B1 * | 7/2001 | Ramachandran et al. .... 348/148 |
| 6,298,290 B1 | 10/2001 | Abe et al. |
| 6,333,759 B1 | 12/2001 | Mazzilli |
| 6,389,339 B1 | 5/2002 | Just |
| 6,411,874 B2 | 6/2002 | Morgan et al. |
| 6,421,080 B1 | 7/2002 | Lambert |
| 6,472,771 B1 | 10/2002 | Frese et al. |
| 6,518,881 B2 | 2/2003 | Monroe |
| 6,535,804 B1 | 3/2003 | Chun |
| 6,556,905 B1 | 4/2003 | Mittelsteadt et al. |
| 6,611,740 B2 | 8/2003 | Lowrey et al. |
| 6,684,137 B2 | 1/2004 | Takagi et al. |
| 6,728,612 B1 | 4/2004 | Carver et al. |
| 6,732,032 B1 | 5/2004 | Banet et al. |
| 6,735,503 B2 | 5/2004 | Ames |
| 6,737,954 B2 | 5/2004 | Chainer et al. |
| 6,739,078 B2 | 5/2004 | Lajoie et al. |
| 6,760,757 B1 | 7/2004 | Lundberg et al. |

(Continued)

*Primary Examiner* — Khoi Tran
*Assistant Examiner* — Jorge Peche
(74) *Attorney, Agent, or Firm* — Integrity IP; Jos. E. Page

(57) ABSTRACT

Video event recorders are coupled to a vehicle power source via an on-board diagnostic system including its power bus, data bus, and scanner port connector. Video event recorders are provided with a power input arranged in conjunction with a standard ODBII type "D" connector. Systems further include an extension cable between the connector and the vehicle event record to accommodate mounting needs associated with each. In advanced versions, both OBD power and data networks are coupled to the vehicle event recorded such that data relating to vehicle diagnostic systems can be captured in a triggered event along with video data. In addition, some versions are provided with special detection mechanism to determine the use state of a vehicle and adjust application of power accordingly. Thus an "in-use" detector is coupled to the vehicle and/or OBD systems to provide feedback which helps to conserve power and regulate the power connections.

3 Claims, 3 Drawing Sheets

(56) References Cited

U.S. PATENT DOCUMENTS

| | | |
|---|---|---|
| 6,795,111 B1 | 9/2004 | Mazzilli |
| 6,810,362 B2 | 10/2004 | Adachi et al. |
| 6,812,831 B2 | 11/2004 | Ikeda |
| 6,819,989 B2 | 11/2004 | Maeda et al. |
| 6,831,556 B1 | 12/2004 | Boykin |
| 6,832,141 B2 | 12/2004 | Skeen et al. |
| 6,842,762 B2 | 1/2005 | Raither et al. |
| 6,850,823 B2 | 2/2005 | Eun et al. |
| 6,859,695 B2 | 2/2005 | Klausner |
| 6,865,457 B1 | 3/2005 | Mittelsteadt et al. |
| 6,898,492 B2 | 5/2005 | de Leon et al. |
| 6,919,823 B1 | 7/2005 | Lock |
| 6,928,348 B1 | 8/2005 | Lightner et al. |
| 6,947,817 B2 | 9/2005 | Diem |
| 7,317,974 B2 * | 1/2008 | Luskin et al. ............ 701/31.5 |
| 2002/0091473 A1 | 7/2002 | Gardner et al. |
| 2002/0169530 A1 | 11/2002 | Laguer Diaz et al. |
| 2002/0183905 A1 | 12/2002 | Maeda et al. |
| 2003/0028298 A1 | 2/2003 | Macky et al. |
| 2003/0154009 A1 | 8/2003 | Basir et al. |
| 2004/0044452 A1 | 3/2004 | Bauer et al. |
| 2004/0070926 A1 | 4/2004 | Boykin et al. |
| 2004/0083041 A1 | 4/2004 | Skeen et al. |
| 2004/0088090 A1 | 5/2004 | Wee |
| 2004/0111189 A1 | 6/2004 | Miyazawa |
| 2004/0138794 A1 | 7/2004 | Saito et al. |
| 2004/0210353 A1 | 10/2004 | Rice |
| 2004/0254698 A1 | 12/2004 | Hubbard et al. |
| 2005/0099498 A1 | 5/2005 | Lao et al. |
| 2005/0100329 A1 | 5/2005 | Lao et al. |
| 2005/0131585 A1 * | 6/2005 | Luskin et al. ............... 701/1 |
| 2005/0131595 A1 * | 6/2005 | Luskin et al. .............. 701/29 |
| 2005/0137796 A1 | 6/2005 | Gumpinger |
| 2005/0146458 A1 * | 7/2005 | Carmichael et al. ......... 342/52 |
| 2005/0233805 A1 * | 10/2005 | Okajima .................... 463/31 |
| 2006/0095175 A1 | 5/2006 | deWaal et al. |
| 2006/0226344 A1 * | 10/2006 | Werth et al. ........ 250/214 VT |
| 2007/0136078 A1 * | 6/2007 | Plante ........................ 705/1 |
| 2007/0142986 A1 * | 6/2007 | Alaous ...................... 701/35 |
| 2007/0179691 A1 * | 8/2007 | Grenn et al. ............... 701/29 |
| 2008/0059019 A1 * | 3/2008 | Delia et al. ................ 701/35 |
| 2008/0111666 A1 * | 5/2008 | Plante et al. ............ 340/425.5 |
| 2008/0143834 A1 * | 6/2008 | Comeau et al. ............ 348/148 |

* cited by examiner

POWER MANAGEMENT SYSTEMS FOR AUTOMOTIVE VIDEO EVENT RECORDERS

BACKGROUND OF THE INVENTIONS

1. Field

The following inventions disclosure is generally concerned with automotive on-board diagnostics systems, data and power distribution networks and specifically concerned with on-board diagnostics networks and their coupling with smart power management systems arranged to provide power to connected video event recorders.

2. Prior Art

As automobiles generally include autonomous electrical power supply systems, it is important to carefully arrange and couple electrical power consuming devices to avoid overburdening the capacity of the supply. One understands completely how headlamps left energized while an engine is not running tends to render the power supply system completely drained in only a few hours. The headlamps consume the entire stored electrical capacity which is not renewed when the engine is not turning an electrical generator. When an engine is running, headlamps may be left on indefinitely as the alternator supplies ample energy to the headlamps while at the same time providing energy to recharge the storage battery. Accordingly, installation of automotive systems and devices which consume electrical power should be designed with a view towards consuming power in accordance with its availability.

It is quite well known in the automotive arts that non-essential electrical subsystems may be coupled in series with an ignition system whereby power is cut-off during times when the ignition switch is in an 'off' position. Vehicle operators who leave a car taking keys alongwith, necessarily cause power to be disconnected from those instruments so coupled via the ignition switch.

It is however sometimes desirable to leave some systems connected to the power supply even when an ignition system is in an "off" position. Power remote door lock systems require continuous power supply in order to remain operative. Accordingly, those systems are not coupled to the electrical power supply via the ignition, but rather, via a circuit which remains energized at all times.

Certain new advanced electronic systems are now being made available for use in conjunction with an automobile in service. One important new system is known as a "video event recorder". Video event recorders are being deployed in service and fleet vehicles in a manner whereby a video record relating to vehicle use is electronically stored for further review. A primary example of these systems includes installation of digital video recorders with police cruiser type patrol vehicles. A police cruiser is frequently in a position where a video record is quite useful to have. In addition, more-and-more fleet type vehicles are being equipped with video event recorder systems. A vehicle fleet is an important corporate asset which benefits from protection via use of these mobile video systems.

Present, state-of-the-art video recorders are connected to the electrical power supply via a 'hardwire' or direct, unswitched connection. In this way, power is continuously provided to the video systems as long as the source is able to supply it. This enables the video system to capture video images even when an ignition key has been removed from the vehicle. However, the amount of energy consumed can be non-negligible. Indeed, it is entirely possible to completely the drain an automobile battery with these constantly connected video systems in a short period (a few days is certainly enough; under some circumstances a far shorter time will deplete a battery).

A further problem arises which is a bit more subtle but nevertheless important. Automobile type batteries are designed to supply a very large current in a short burst and to be recharged or 'topped off' shortly thereafter. Thus, the physical configuration of the battery supports a preference for a "fully charged" state. It is possible to configure a battery for efficient operation at reduced charge levels, but automobile batteries are not designed this way. A typical yacht battery in contrast, sometimes known as a "deep cycle" battery is designed for use in this manner. While it is certainly possible to use a deep cycle type battery in vehicles with 'always-on' video event recorders, this solution is a bit impractical. It is not desirable to impose new requirements on a vehicle's electrical supply system because a certain install configuration, i.e. "always on", is somewhat desirable.

Another approach in the art suggests that a video event recorder be coupled to the power supply by the ignition switch. When the switch is in the "off" position, the video event recorder no longer consumes electrical power and remains inoperative until the ignition is reactivated. This is a valuable approach, but unfortunately leaves the video event recorder without power at certain times when it would be desirable to have power. This solution is also accompanied by the difficulty of providing an installation which couples to the ignition switch which may vary greatly from one vehicle model to another. It is a great disadvantage to attempt such connections to automobile power systems.

It is possible to provide a video event recorder with coupling to a power supply via an independent switch which may be operated without regard to the ignition. However such manual type switch couplings suffer from a great number of inconveniences and difficulties which need not be enumerated here.

It is thus desirable to provide a system which permits efficient coupling to a vehicle's power system, that does not overload a supply by consuming power during times when the system cannot sufficiently provide supply, and further to cooperate with standard equipment available in all models of vehicles. These, among other motivations, lead to systems described in detail here following.

SUMMARY OF THESE INVENTIONS

Comes now, Bruce Lightner, Ramesh Kasavaraju and James Plante with inventions of power management systems in conjunction with video event recorders. It is a primary function of these systems to provide advanced power couplings for video event recorders. It is a contrast to prior art methods and devices that these systems first presented here couple to a vehicle's power source with regulation thus preventing an unnecessary drain of power and sometimes total system malfunction. A fundamental difference between video event recorders of these inventions and those of the art can be found when considering its installation and connection with regard to an on-board diagnostic system.

Video event recorders of these inventions are coupled to an automotive power supply via an on-board diagnostics system (OBD) power bus. And on-board diagnostics system scanner port includes a connector having at least one lead associated with a power supply function. Installation of a video event recorder in agreement with these teachings includes a connection from the video event recorder to the widely available on-board diagnostics system scanner port; specifically, to the lead associated with the power bus. These systems may include a standard OBD male "D"-type connector separated by an interconnecting cable of sufficient length, to the video event recorder which may be mounted at or around a vehicle windscreen.

In most important versions, a power management module is included between the OBD system and the video event recorder to regulate and control power provided thereto. A power management module includes means to determine periods when a vehicle is in an "in-use" and in a "standby" mode. Upon detection of an "in-use" condition, the power management module powers up the video event recorder so that it functions normally. When a vehicle is "standing by" for extended periods, the power management module cuts power so that excess is not consumed; thus preserving battery life. Vehicle use status may be determined by various indicators. In some versions, the voltage level on the power supply system implicitly indicates whether or not the engine is running. Thus a voltage measurement may be used to switch power to the video event recorder in agreement with a declared "in-use" state. Alternative versions of power management modules include use detection schemes having a motion sensor to determine whether or not the vehicle is still for an extended period of time. In the case where motion is detected, an "in-use" state is declared and power is supplied to the video event recorder by way of the cable connecting the power management module and OBD system scanner port to the video event recorder.

A power management module may be devised to listen to data bus for certain specified data traffic. When prescribed data traffic is present an assumption regarding use state may be made. In this case the power management module may provide a response where power is switched in accordance with the information sensed on the various data buses of the on-board diagnostics system. Finally, in some advanced versions, combinations of motion, voltage level detection, and prescribed types of data traffic are used to define thresholds for an "in-use" status.

OBJECTIVES OF THESE INVENTIONS

It is a primary object of these inventions to provide couplings between video event recorders and automotive type power supply systems.

It is an object of these inventions to provide electrical coupling and power management for video event recorders.

It is a further object to provide power supply couplings for video event recorders in conjunction with on-board diagnostic systems.

It is an object of these inventions to provide switched power supply couplings to reduce power consumption when a vehicle is in a stand-by or non-use mode.

In some versions, it is an object to provide power management where switching is coupled to the charging state of a supply system.

In alternative versions, it is an object to provide power management where switching is coupled to detected vehicle motion.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

GLOSSARY OF SPECIAL TERMS

Figure 1:
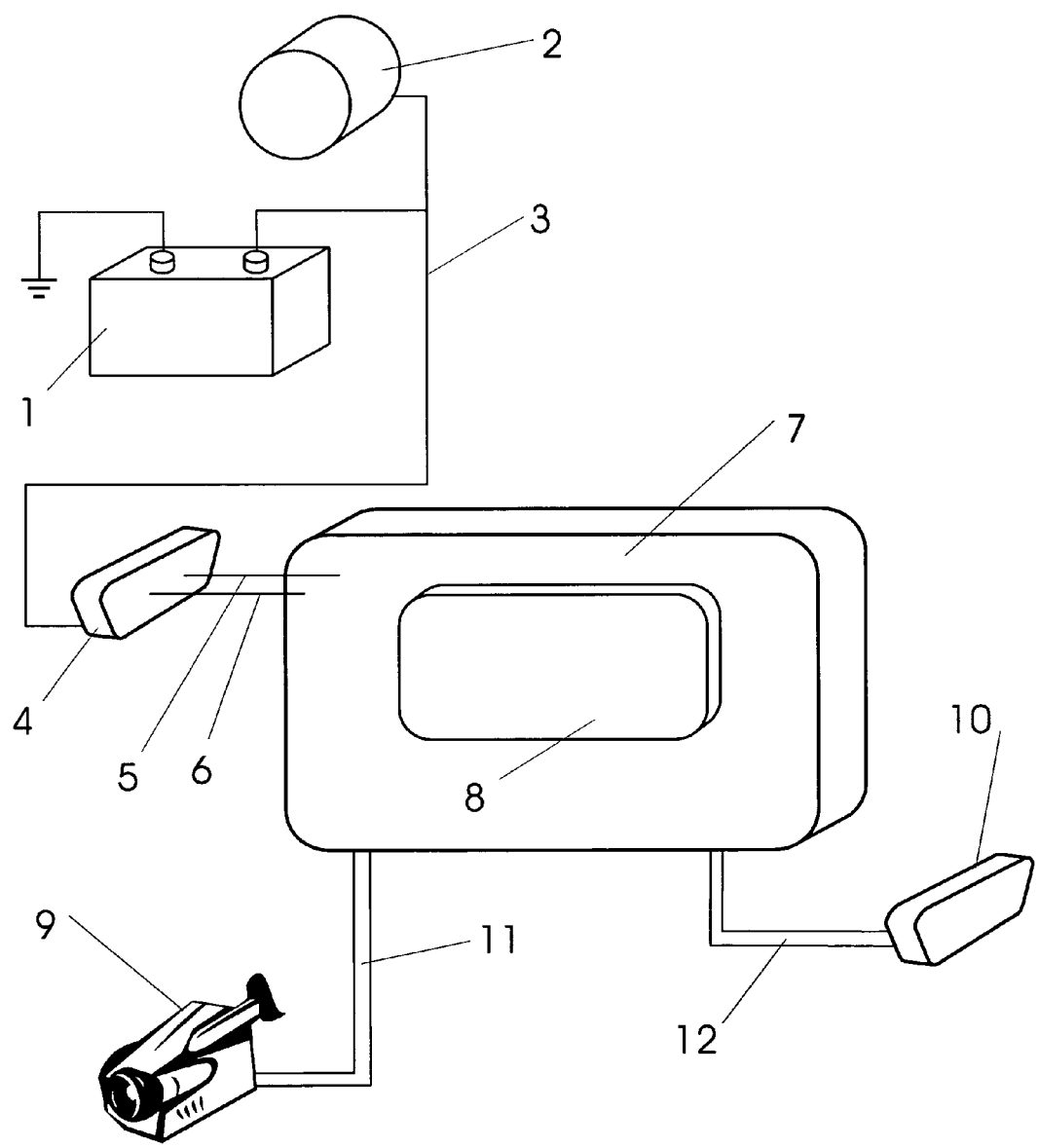
FIG. 1 is an illustration of major system components and their relation with vehicle systems.

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Video Event Recorder—VER

A video event recorder is a system arranged to capture data in response to a triggered event, data captured relates to use and performance of the vehicle and includes images from a digital video camera and numeric measurements.

On-Board Diagnostics System—OBD

An 'on-board diagnostics' system includes standard electrical network provided and used in the automotive industry for data and power distribution and sharing. While a most common implementation is sometimes known as OBDII, it is explicitly noted here that a broad definition of 'OBD' is meant as a general term including various standards, both commercial and consumer, of data and power distribution networks used in vehicles.

"D"-Type Connector

A "D"-type connector is an electrical connection means including a mechanical interlocking system whereby a plurality of electrical connections are made when mating parts are coupled together.

"In-Use" Detector

An "in-use" detector is a system arranged to declare the operational state of a vehicle in either of two exclusive states including "in-use" and "stand-by".

PREFERRED EMBODIMENTS OF THESE INVENTIONS

In accordance with each of preferred embodiments of these inventions, apparatus for power management in vehicle event recording systems are provided. It will be appreciated that each of the embodiments described include an apparatus and the apparatus of one preferred embodiment may be different than the apparatus and method of another embodiment.

In simplest versions of these inventions, a video event recorder is coupled and connected to an on-board diagnostic system at its scanner port. Newly manufactured vehicles are now mandated to include an on-board diagnostic system. These systems most generally include an electrical access port into which an on-board diagnostics type scanner tool may be plugged. The connector associated with this port, sometimes and herein referred to as a "D"-type connector, is generally located under the dashboard at the left-hand or driver's side. A video event recorder provided with an electrical cable suitable for extending from a mounting position at or about a windscreen to the under dashboard location, and a suitable mating "D"-type connector, may be coupled to a standard on-board diagnostic system (modern versions of on-board diagnostic systems are presently referred to as OBDII to reflect being a second generation). The video event recorder benefits from such installations because it can receive both power and data from the on-board diagnostic system.

Accordingly a first preferred embodiment is an automotive electrical power management system with an electrical power source (car battery); an on-board diagnostics system (standard installed); and a video event recorder. The electrical power source is coupled to the on-board diagnostic system in a manner to supply electrical power thereto, particularly on a prescribed power bus. The video event recorder's power input is electrically connected to said on-board diagnostic system power bus.

Since the preferred location for mounting a video event recorder camera and the location of an on-board diagnostic system scanner port connector are predefined and not readily adjustable, the systems include special electrical cable which extends between these two locations. For all practical cases, at least 8 inches must be allocated between a video event recorder and a "D" connector suitable for coupling with an on-board diagnostic scanner port. Accordingly, these devices include the systems where a video event recorder is separated from an on-board diagnostic system "D" connector by eight or more inches of cable.

In some versions, a video event recorder is coupled to an on-board diagnostic system by way of its scanner port and receives therefrom supply of electrical power without regard for on-board diagnostic systems data networks. In more advanced versions, a video event recorder is coupled to an on-board diagnostic system and receives both power and data therefrom. Thus, a cable may only support a power coupling. That is, a cable may be as simple as having only one lead, that lead being coupled to pin 16 of the "D"-type connector. However, in a preferred versions, the cable supports data and power couplings. As such, these cables include a plurality of leads including those arranged in view of an OBD standard including various data buses, power supply line, and electrical ground. While it is conceivable that a cable be only 8 inches in length, in most versions a cable will exceed that measure. Cameras mounted behind a windscreen at a rearview mirror would require a cable of a few feet in length. For professional and tidy installations, it is preferred that a cable be installed to cooperate with the interior design of a vehicle operator/passenger compartment; as such, the cable may require additional length whereby it can be routed around and near interior trim features for example.

Because installations as presented consume the place otherwise allocated for an on-board diagnostics system scanner plug-in, it is sometimes important to provide an auxiliary port into which a scanner tool may be coupled. It is further desirable to provide the support in a manner which does not require disassembly or uninstallation of the video event recorder and its related systems. Thus, in some preferred versions, an auxiliary port is provided such that a scanner tool may be simultaneously coupled to the on-board diagnostics system. However, in some vehicles this can be problematic. Since the video event recorder is arranged to appear to the OBD system to be a scanner, i.e. some video event recorder versions are arranged to communicate on the data buses in a manner which emulates a scanner, the presence of a "second" scanner can cause protocol conflicts. Accordingly, some of these systems are devised with special means to detect the presence of a scanner tool and to disable data communications in the video event recorder during those times. Note it is not necessary to disable the power applied to the video event recorder and the camera may be arranged to continue to capture video despite the presence of a scanner tool.

While the versions presented above are quite useful in their base form, they may be further improved by inclusion of a power management module. A power management module may be electrically coupled to the on-board diagnostic system; particularly to the power bus. A power management module can be arranged between the on-board diagnostic system and a camera unit of the video event recorder such that it operates to detect when a vehicle is in-use or in-standby mode and respond by applying or removing power from the video event recorder. In best versions a "D" connector is separated from a power management module by a short cable which leads to a power management module housing containing electronics therein. A second cable runs from the power management module to the video event recorder which may be remotely mounted. In this way it is possible to easily mount the power management module out of harm's way and under the dashboard of the vehicle. This mounting is best taken up quite near the same location the original vehicle manufacturer installed the on-board diagnostic system scanner port.

In preferred versions a power management module is comprised of an "in-use" detector and a switch. An "in-use" detector is arranged to determine whether or not a vehicle is in an active operational state or conversely in a standby state. An "in-use" detector has a binary output coupled to drive or toggle the switch. The two poles of the switch may be coupled one each to the power supply line of the on-board diagnostic system and the power input of the video event recorder. When a determination is made as to a change in the vehicle operating state, the "in-use" detector provides a corresponding signal to the switch which causes power to be applied or removed from the video event recorder camera.

An "in-use" detector includes a portion to sense physical parameters of the vehicle and/or on-board diagnostic systems and to compare a measurement value with a prescribed threshold value the result of such comparison being application of a switch toggle signal where appropriate.

In one preferred version, an "in-use" detector is arranged as a voltage sensor coupled to the vehicle power source by way of the on-board diagnostic system. Automobile electrical systems are quite standard the world over. In general, nearly all vehicles used a 12V direct current power supply. A standard automotive Pb/acid battery comprises six cells each connected in series with the others typically produces between about 1.9 and 2.1V. This is set and nonnegotiable as the device chemistry causes it to be so. To charge these batteries, one need merely apply a voltage a bit higher than that produced by the battery to result in a reverse current and a charging action. Thus an automobile electrical system generally includes an alternator charging system which produces about 14V applied to the battery "high" potential side. When a battery is properly coupled to an effective charging system, the entire power supply system remains at 14V at all times while the charging system is active. Thus if one measures the voltage of a car's electrical system it will be about 12V when a car is not running (stand-by) and 14V when running (in-use). Accordingly, if one were to detect the voltage of an automobile power supply at any time, it is possible to determine whether or not the engine is running or in an "in-use" state.

In a second preferred version, an "in-use" detector is arranged with a motion sensor. A motion sensor is not part of the on-board diagnostic system but rather is provided as part of the power management module. Motion sensors can be arranged to detect very slight motion. In this way, a power management module can be made responsive to subtle movements such as merely opening a door of a vehicle. Thus an operator's entry into the vehicle sets the vehicle into an "in-use" state and consequently results in a 'wake-up' of the VER as power is applied. Certainly while a vehicle is in motion on roadway motion detector continue to indicate that the vehicle is being used.

In a third preferred version, an "in-use" detector is set up to monitor data traffic on either of the data buses of the on-board diagnostic system. Where a certain prescribed type of data traffic is detected, an "in-use" state may be declared. Similarly, when data silence or some other prescribed form of data traffic is found, a "stand-by" state may be declared. In response to either of these determinations, the "in-use" detector may provide the switch with a driving signal which sets the switch position according to the use state detected. Thus, activity on the on-board diagnostic system data buses can also be used to provide indication as to the use state of a vehicle via an in-use detector which is part of a power management module.

While each of these "in-use" detection schemes provides certain benefit, there may be other occasions where each of these in combination with another may provide an even more effective system. Thus these inventions anticipate "in-use" detectors where a plurality of physical measurements are made and compared with thresholds and processed through a logic system which finally has a single binary output coupled to the power switch.

A more detailed understanding may be realized in view of the figures appended hereto which include reference numerals associated with the various important elements. In particular, FIG. 1 illustrates major system elements and various cooperation therebetween. The battery of electrical cells 1 stores electrical energy during times when a vehicle engine is not running; or while the electrical system is herein said to be in a 'standby' mode. An alternator type electrical generator 2 connected to a vehicle's engine produces electricity whenever the engine is running. Together, the battery and alternator and their respective supporting systems, (voltage regulator for example) make up the DC power source for automobiles.

A power line 3 is coupled to an on-board diagnostics system OBD represented in the diagram by its connector 4 symbol. An OBD system includes both a power distribution network/bus 5 and eight data network/bus 6.

A power management module 7 is arranged to interface directly with the OBD system. Thus the power and data buses may be controlled and managed by the power management module. A special portion of the power management module includes an "in-use" detector 8. An "in-use" detector is arranged to determine the periods when the vehicle is in use or is actively being operated. This may be accomplished in various ways. Among the most important ways include a power source voltage detection system, a motion detector system, and a data traffic detection system. Beside these, alternative forms of "in-use" detection systems are possible. The power manager module is coupled to a video event recorder 9 and provides power only at appropriate times. For example, when the vehicle is parked and at rest for long periods, it is not useful for the video event recorder to continue to consume power. In these times, the power manager module disconnects power to the video event recorder and the video event recorder no longer consumes power. When the power management module determines the vehicle has entered into an in-service or "in use" status, the power management module activates couplings to the video event recorder with appropriate power and data connections. In addition, a power management module of these inventions may further include an auxiliary OBD interface port 10 to provide scanner tools easy access to the OBD system while the power management module and video event recorder remain installed without interruption.

Figure 2:
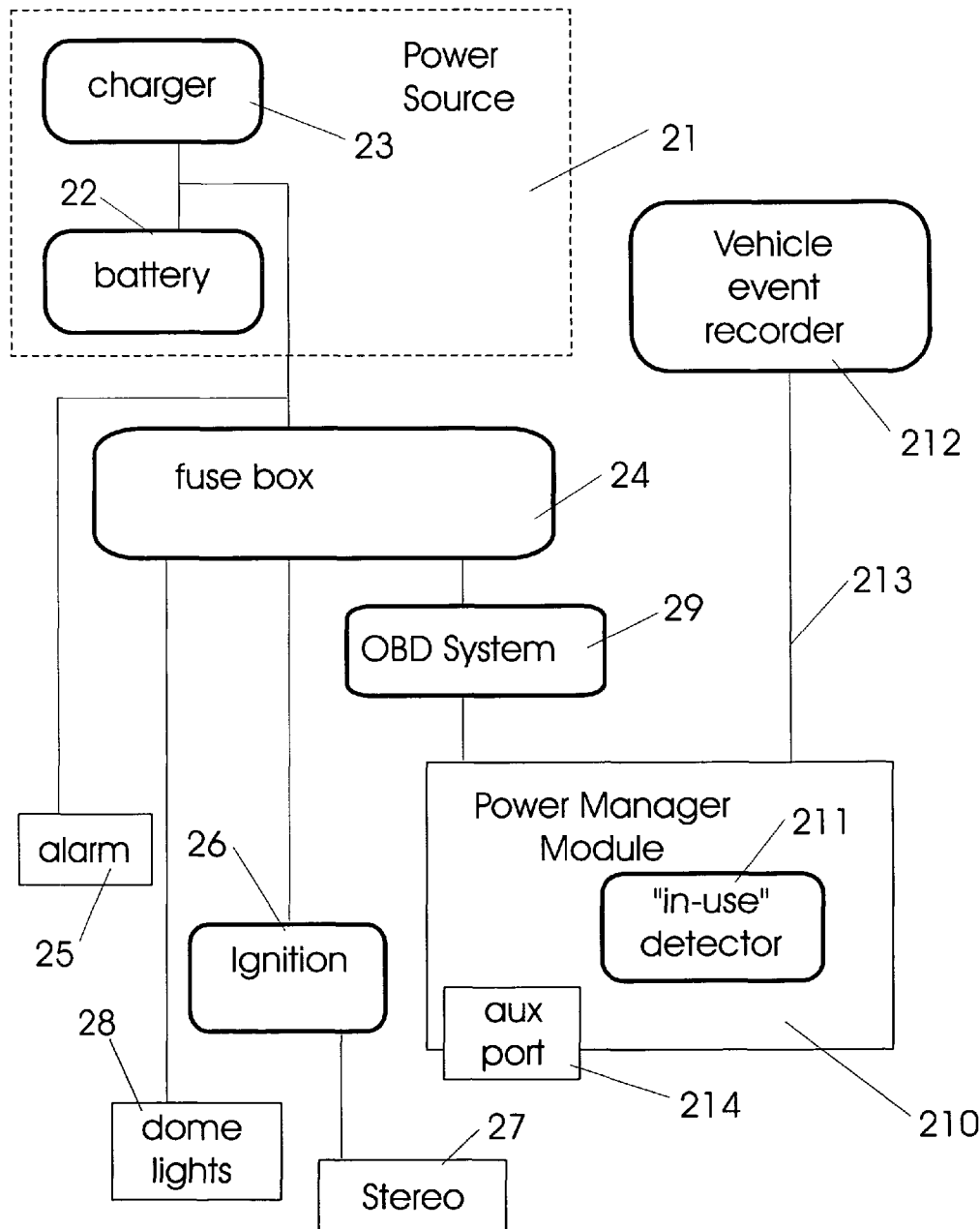
FIG. 2 is a block diagram showing major elements and their couplings with cooperating elements.

FIG. 2 illustrates in block diagram important elements in vehicle power and data networks. One may consider this diagram in gaining a better understanding of various possible connection types to a vehicle power source 21. A power source includes a battery type electrical storage system 22 and a power generation means or charger system 23. A vehicle's power supply is generally connected to all consuming devices by way of a fuse box 24. A fuse box may distribute power to various of vehicle subsystems as it is designed to support a plurality of distinct electrical circuits. While nearly all systems are connected by way of the fuse box, in special circumstances it may be desirable to "hardwire" a device to the power source. An alarm system 25 is more tamperproof if the fuse box is bypassed because it would remain operable even when a thief attempts to disable it at the electrical junction/fuse box.

Most vehicle subsystems are connected to the power source in a series circuit which includes the vehicle ignition system 26 in this way, power is cut off to these devices whenever the ignition is in an 'off' state. A stereo system 27 is a good example of an automotive electrical appliance which is preferably not permitted to operate when the ignition is off. A stereo left on could easily consume all available power and run a battery down completely. In contrast, some electrical systems are better left operable without regard for the state of the ignition system. A dome light 28 provides a certain additional safety system which is nice to have available even when a key is not in the ignition. For example, a light might be useful when looking for a dropped ignition key!

Most modern production automobiles now include an on-board diagnostics system as standard equipment. And OBD system 29 includes both data buses and a power bus. The power bus of an OBD system is needed even when an ignition is in the 'off' position. Consequently an OBD power bus is connected directly to the fuse box. This makes power available to OBD coupled systems at all times without regard to the state of the ignition. An important primary element of these systems is a power management module 210. A power management module is coupled to an OBD system including the power bus and data buses. In preferred versions, a power management module is plugged into the standard scanner port connector under the dashboard in most cars.

A power management module comprises an "in-use" detector 211 which determines whether or not the vehicle is in use and provides power to a video event recorder 212 along extension cable 213 whenever such determination is made. The "in-use" detector includes subsystems to detect certain physical conditions and to provide a binary output to a switch which couples OBD power bus to the video event recorder.

Because a these systems may be plugged into the only available scanner port, the presence of them tends to disrupt easy availability of scanner access to the OBD. Accordingly, it is sometimes advantageous to include as part of a power management module, an additional physical connector fashioned in parallel as an OBD interface or auxiliary scanner port 214.

Figure 3:
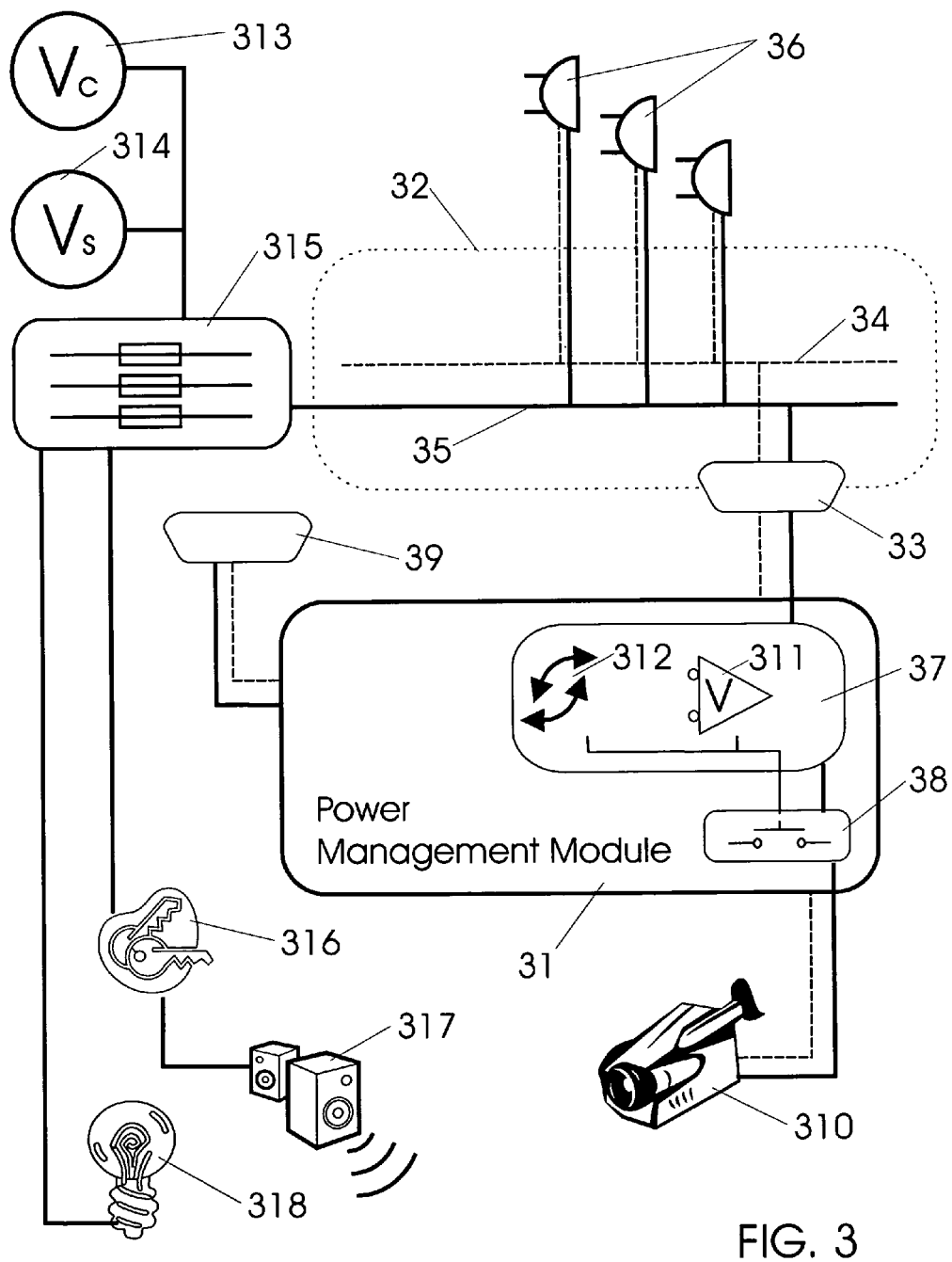
FIG. 3 is schematic diagram to further illustrate the electrical relationship between coupled systems.

The schematic diagram of FIG. 3 further illustrates primary elements and couplings between primary elements from which these systems are comprised. A most important element is the power management module 31. The power management module is designed and engineered to couple intimately with the standard diagnostic buses widely used in automobile industries including those known as OBDII 32. These two systems may be physically joined at a common connector 33, a 16 pin "D" connector. The 16 and support several data bus protocols on various pins (for example on pin 6, 10, 14, 15), grounded contacts, and a single power supply bus 35 on pin 16. This coupling is easily achieved without disrupting any of the many OBD coupled systems 36. The power management module is comprised of three main subsystems including an "in-use" detector 37, a switch 38, and an auxiliary port 39.

The "in-use" detector is arranged to detect and declare a vehicle to be "in use". When an "in-use" condition is detected, the "in-use" detector toggles the switch to connect power from the OBD to the video event recorder 310. The "in use" detector may determine an "in-use" condition in several alternative or cooperative ways. In a first way, the "in-use" detector includes a comparator 311 having one input coupled to the OBD power bus and one input coupled to a reference voltage. The comparator has an output coupled to the switch. When a vehicle is "standing by", or not in use, the voltage on the power supply bus is approximately 12 V. When the engine is running the charging system with a voltage regulator produces about 14 V. So, if a reference voltage of 13 V is selected for a comparator input, when an engine begins to run the comparator will drive the switch to provide power and enable the video event recorder during times when the vehicle is being used or at least at times while the engine is running. It has been found via experimentation that 13.2 is a particularly effective threshold as some standard batteries run with voltage a bit higher than 12 but rarely if ever above 13.2.

It is not necessary to use the charging voltage of the power supply to determine if the car is being used. Sometimes it is advantageous to declare an "in-use" state merely upon detection of subtle motion. Accordingly, some versions of these power management modules include a motion sensor 312. Even the slight movements can be used to trigger power up of a video event recorder. When a vehicle remains motionless for an extended period, a stand-by state may be declared and power from the OBD to the video event recorder may be interrupted or switched off. The switch which is driven by signals from the "in-use" detector is arranged between the OBD power bus and the video event recorder whereby power to the video event recorder may be interrupted at times when the vehicle is not in use.

An auxiliary scanner port 39 is sometimes included in preferred versions of these power management module systems. It is highly desirable to provide a tidy installation for video event recorders which leaves the vehicle and all its systems unimpaired and fully functional. Therefore it is an important aspect of preferred versions that the standard manufacture installed OBD scanner port not be blocked. To effect this, these systems include a physical connector into which a standard OBD scanner may be inserted without removal of either the power management module or the video event recorder. However, it is not only the physical connector which must be provided but also a bit of logic management. Because conflicts may arise when two scanners are present on an OBD system, a mechanism is included to interrupt data communicates with the VER whenever a scanner is present in the auxiliary port. In the way, the OBD system only "sees" a single scanner at any given time.

One will now fully appreciate how video event records are best couple to automotive power supply systems. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

What is claimed is:

1. Automotive electrical power management systems comprising:
   a DC electrical power source;
   an on-board diagnostics system; and
   a video event recorder,
      said DC electrical power source is coupled to said on-board diagnostic system to supply direct current electrical power thereto on a prescribed power bus,
      said video event recorder having a power input electrically coupled to said on-board diagnostic system power bus,
      said video event recorder is comprised of a cable not less than 8 inches in length with a terminating "D"-type connector suitable for coupling with standard OBDII systems, a video event recorder power supply line is coupled to the OBDII power bus on pin 16,
      said video event recorders further comprise an auxiliary female "D" connector arranged in parallel and suitably adapted to receive therein a standard OBDII scanner.

2. Automotive electrical power management systems of claim 1, includes a switch to disable data communications to and from said camera unit while a auxiliary scanner is detected as being connected at the auxiliary port.

3. Automotive electrical power management systems comprising:
   a DC electrical power source;
   an on-board diagnostics system and
   a video event recorder,
      said DC electrical power source is coupled to said on-board diagnostic system to supply direct current electrical power thereto on a prescribed power bus,
   said video event recorder having a power input electrically coupled to said on-board diagnostic system power bus,
   further comprising a power management module, said power management module electrically coupled to said on-board diagnostic system power bus and arranged between said on-board diagnostics system and a camera unit of said video event recorder,
   said power management module comprises an auxiliary female "D" connector arranged in parallel and suitably adapted to receive therein a standard OBDII scanner.

* * * * *